United States Patent [19]

Terada et al.

[11] Patent Number: 5,133,114
[45] Date of Patent: Jul. 28, 1992

[54] SPRING CLIP FOR A HEAT SEAL CONNECTOR

[75] Inventors: Toshiyuki Terada, Tokyo; Nobuo Matsui, Yokohama, both of Japan

[73] Assignee: Stanley Electric Co. Ltd., Tokyo, Japan

[21] Appl. No.: 657,634

[22] Filed: Feb. 19, 1991

[30] Foreign Application Priority Data

Feb. 22, 1990 [JP] Japan .................................. 2-17260

[51] Int. Cl.⁵ .............................................. A44B 21/00
[52] U.S. Cl. ...................................................... 24/563
[58] Field of Search ................. 24/530, 545, 555, 561, 24/563; 359/88

[56] References Cited

U.S. PATENT DOCUMENTS

| 1,056,524 | 3/1913 | Flak | 24/563 X |
| 3,711,905 | 1/1973 | Eckerdt et al. | 24/563 |
| 4,095,608 | 6/1978 | Holmes | 24/561 X |

FOREIGN PATENT DOCUMENTS 1392907  2/1965  France .................................. 24/563

*Primary Examiner*—James R. Brittain
*Attorney, Agent, or Firm*—Weingarten, Schurgin, Gagnebin & Hayes

[57] ABSTRACT

A spring clip for a heat seal connector used to secure a thermocompression bonded portion of a heat seal connector in a manner not to be peeled off by an external force is disclosed. The spring clip is used in order to hold a thermocompression bonded portion with a fine pitch of a terminal portion in a heat seal connector, and designed so that a spring portion and a holding portion are formed continuously and lengthily, and a plurality of punched portions to weaken a spring pressure are provided at fixed intervals only on the side of the spring portion.

1 Claim, 1 Drawing Sheet ated at 1
SPRING CLIP FOR A HEAT SEAL CONNECTOR

BACKGROUND OF THE INVENTION

1. Field of the Invention

The present invention relates to a spring clip for a heat seal connector, which is used, when in a liquid crystal display unit the liquid crystal display unit and a driving circuit substrate are connected by a heat seal connector, such that the heat seal connector is connected by thermocompression bonding, and a thermocompression bonded portion is fixed so as not to be peeled off by an external force.

2. Prior Art

As prior art of this kind, for example, structures shown in FIGS. 3 to 5 have been known. A spring clip 1 shown in FIGS. 3 and 4 is used in the case where a terminal portion of a heat seal connector has rough pitches (such as pitches 1.27, 2.54, and the like). This spring clip 1 is constructed such that a spring portion 2 and a holding portion 3 are continuously formed, and in order to weaken a holding pressure, a number of slits 4 are provided in an adjacent state corresponding to a spacing between terminal portions in the heat seal connector.

However, in the case where the terminal portion in the heat seal connector has a fine pitch (pitch 0.5), the structure shown in FIG. 5 is unavoidably employed because it is difficult to provide slits corresponding to the pitch in terms of machining and because it is difficult to make alignment when a clip is used. In this case, the spring portion 2 and the holding portion 3 are continuously formed, and therefore the holding pressure becomes relatively high.

In the above-described prior art, particularly in the case where the terminal portion in the heat seal connector has fine pitch, the clip has to be formed without slit. However, when the spring pressure is too high as a whole and the clip is lengthy, it becomes extremely difficult to do work for mounting the clip for the purpose of holding, and such spring pressure should be solved.

SUMMARY OF THE INVENTION

It is an object of the present invention to provide a spring clip for a heat seal connector, which is used in order to hold a thermocompression bonded portion with a fine pitch of a terminal portion in a heat seal connector, characterized in that a spring portion and a holding portion are formed continuously and lengthily, and a plurality of punched portions to weaken a spring pressure are provided at fixed intervals only on the side of the spring portion. The punched portions are provided whereby the spring pressure on the side of the spring portion becomes weakened not only to facilitate mounting work but also the holding portion can be formed without being adjusted to the pitch of the terminal portion, making it easy to manufacture the same.

DETAILED DESCRIPTION OF THE PREFERRED EMBODIMENT

Figure 1:
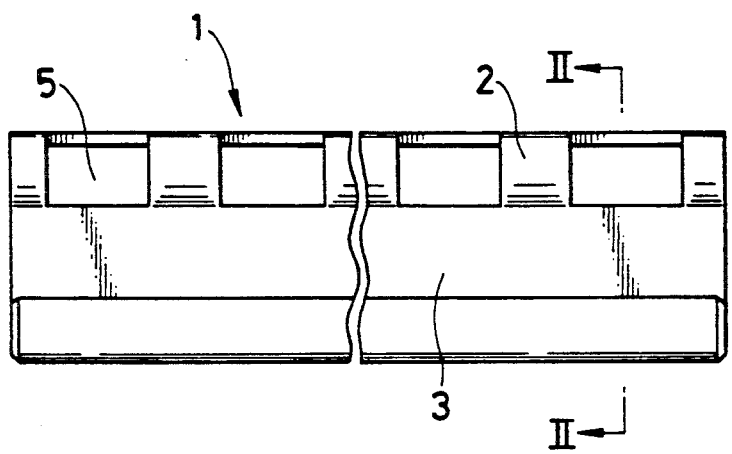
FIG. 1 is a front view of a spring clip for a heat seal connector according to the present invention.
Figure 2:
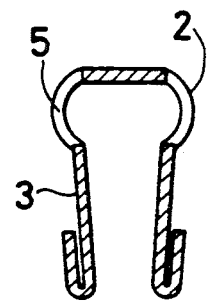
FIG. 2 is a sectional view taken on line II—II of FIG. 1.
Figure 3:
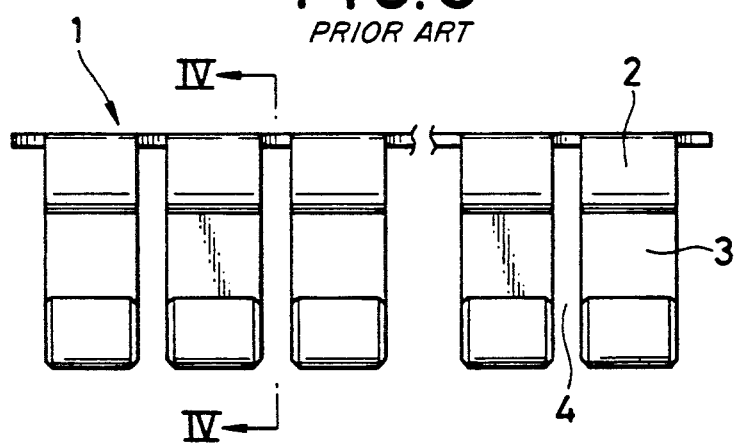
FIG. 3 is a front view showing one example of a conventional clip.
Figure 4:
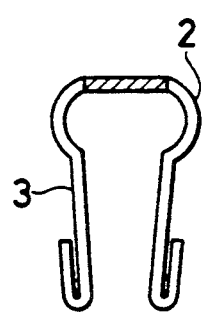
FIG. 4 is a sectional view taken on line IV—IV of FIG. 3.
Figure 5:
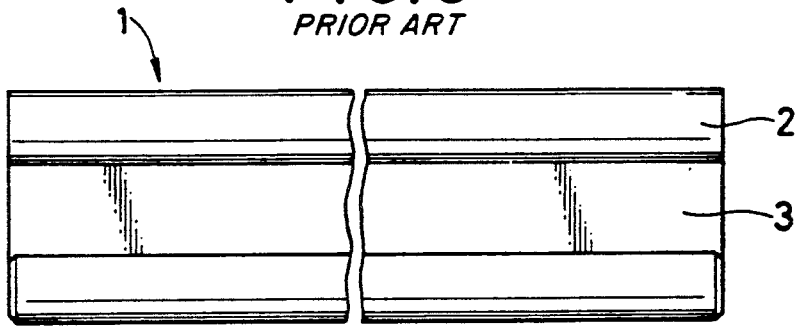
FIG. 5 is a front view showing a further example contemplated as prior art.

The present invention will be described in detail by way of an embodiment shown in the drawings. It is to be noted that for better understanding, the same parts as those of prior art are indicated by the same reference numerals. In the drawings, a spring clip indicated at 1 comprises a spring portion 2 and a holding portion 3 which are continuously formed. A plurality of punched portions 5 are formed at fixed intervals only on the side of the spring portion 2 in order to weaken the spring pressure of the spring, that is, the holding pressure as a whole.

The punched portions 5 are formed only on the side of the spring portion 2 whereby no slit is required in the holding portion 3. Accordingly, the clip can be used over the wide range irrespective of pitches in the terminal portion in the heat seal connector. The adjustment of the spring pressure can be made by suitably changing the spacing between the punched portions 5 and the size of the punched portions.

As described above, the present invention provides a spring clip for a heat seal connector, which is used in order to hold a thermocompression bonded portion with a fine pitch of a terminal portion in a heat seal connector, wherein a spring portion and a holding portion are formed continuously and lengthily, and a plurality of punched portions to weaken a spring pressure are provided at fixed intervals only on the side of the spring portion. Thereby, The spring pressure on the side of the spring portion becomes weakened, and in addition, the clip need not be mounted while adjusting to the pitch of the terminal portion. Therefore, there is an excellent effect that mounting work at the time of assembly can be easily accomplished.

Moreover, since at the time of manufacture, the holding portion is continuously formed and no slit adjusted to the pitch of the terminal portion is required. Therefore, there is also an excellent effect that the manufacture is materially easy.

What is claimed is:

1. A spring clip to hold a thermocompression bonded portion with a fine pitch of a terminal portion of a heat seal connector, the spring clip comprising:

a longitudinally extending holding portion comprising:

first and second opposed, continuous planar members, each planar member having an upper longitudinally extending margin and a lower longitudinally extending margin, and first and second hook members, each hook member extending from the lower margin of a respective planar member continuously along the longitudinal extent of the respective planar member; and a longitudinally extending spring portion comprising:

a flat, continuous, planar top member having opposed longitudinally extending edges, and first and second opposed, inwardly curved spring members disposed between the respective longitudinally extending edges of the top member and the upper longitudinally extending margin of the respective planar member, the first and second spring members having gaps at spaced intervals therein, whereby weakened spring pressure is provided.

* * * * *